US011858265B2

(12) United States Patent
Linn et al.

(10) Patent No.: US 11,858,265 B2
(45) Date of Patent: Jan. 2, 2024

(54) INTEGRATED CIRCUITS INCLUDING CUSTOMIZATION BITS

(71) Applicant: HEWLETT-PACKARD DEVELOPMENT COMPANY, L.P., Spring, TX (US)

(72) Inventors: Scott A. Linn, Corvallis, OR (US); James Michael Gardner, Corvallis, OR (US); Erik D. Ness, Vancouver, WA (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 0 days.

(21) Appl. No.: 17/985,590

(22) Filed: Nov. 11, 2022

(65) Prior Publication Data

US 2023/0074257 A1 Mar. 9, 2023

Related U.S. Application Data

(63) Continuation of application No. 16/959,065, filed as application No. PCT/US2019/016905 on Feb. 6, 2019, now Pat. No. 11,548,276.

(51) Int. Cl.
*B41J 29/393* (2006.01)
*B41J 2/045* (2006.01)

(52) U.S. Cl.
CPC ....... *B41J 2/04541* (2013.01); *B41J 2/04543* (2013.01); *B41J 2/04586* (2013.01)

(58) Field of Classification Search
CPC ... B41J 2/0458; B41J 2/04543; B41J 2/04541
See application file for complete search history.

(56) References Cited

U.S. PATENT DOCUMENTS

| | | | |
|---|---|---|---|
| 6,547,364 | B2 | 4/2003 | Silverbrook |
| 7,365,387 | B2 | 4/2008 | Benjamin |
| 7,484,831 | B2 | 2/2009 | Walmsley et al. |
| 8,864,260 | B1 | 10/2014 | Ge et al. |
| 9,987,841 | B2 | 6/2018 | Torgerson et al. |
| 10,082,990 | B2 | 9/2018 | Martin et al. |
| 10,118,387 | B2 | 11/2018 | Bakker et al. |
| 11,548,276 | B2 | 1/2023 | Linn et al. |
| 2002/0126168 | A1 | 9/2002 | Anderson |
| 2002/0145640 | A1 | 10/2002 | Anderson et al. |
| 2006/0143454 | A1 | 6/2006 | Walmsley |
| 2009/0244132 | A1 | 10/2009 | Bruce et al. |
| 2010/0302293 | A1 | 12/2010 | Torgerson et al. |
| 2016/0332439 | A1 | 11/2016 | Ge et al. |
| 2019/0001686 | A1 | 1/2019 | Keefe et al. |
| 2019/0016127 | A1 | 1/2019 | Linn et al. |

FOREIGN PATENT DOCUMENTS

| | | | |
|---|---|---|---|
| CN | 104620243 | A | 5/2015 |
| CN | 107102817 | A | 8/2017 |
| EP | 1314562 | A2 | 5/2003 |
| JP | 2000-238245 | A | 9/2000 |
| JP | 2000-238247 | A | 9/2000 |

(Continued)

*Primary Examiner* — Lam S Nguyen
(74) *Attorney, Agent, or Firm* — Foley & Lardner LLP

(57) ABSTRACT

An integrated circuit to drive a plurality of fluid actuation devices includes a plurality of first non-volatile memory cells and control logic. Each first non-volatile memory cell stores a customization bit. The control logic configures an operation of the integrated circuit based on the customization bits.

20 Claims, 10 Drawing Sheets

(56) References Cited

FOREIGN PATENT DOCUMENTS

| | | | |
|---|---|---|---|
| JP | 2001-080078 | A | 3/2001 |
| JP | 2003-159802 | A | 6/2003 |
| JP | 3840244 | B2 | 11/2006 |
| JP | 2017-533126 | A | 11/2017 |
| RU | 2536369 | C2 | 12/2014 |
| WO | 2005/120835 | A1 | 12/2005 |
| WO | 2018/190861 | A1 | 10/2018 |
| WO | 2018/190869 | A1 | 10/2018 |
| WO | 2019/005091 | A1 | 1/2019 |
| WO | 2019/009047 | A1 | 1/2019 |
| WO | 2019/009904 | A1 | 1/2019 |
| WO | 2019/099047 | A1 | 5/2019 |

INTEGRATED CIRCUITS INCLUDING CUSTOMIZATION BITS

CROSS-REFERENCE TO RELATED APPLICATIONS

This application is a Continuation application of U.S. Patent Application Ser. No. 16/959,065, filed Jun. 29, 2020, entitled "INTEGRATED CIRCUITS INCLUDING CUSTOMIZATION BITS," which is a U.S. National Stage Application of International Application No. PCT/US2019/016905, filed Feb. 6, 2019, entitled "INTEGRATED CIRCUITS INCLUDING CUSTOMIZATION BITS," which are incorporated herein by reference.

BACKGROUND

An inkjet printing system, as one example of a fluid ejection system, may include a printhead, an ink supply which supplies liquid ink to the printhead, and an electronic controller which controls the printhead. The printhead, as one example of a fluid ejection device, ejects drops of ink through a plurality of nozzles or orifices and toward a print medium, such as a sheet of paper, so as to print onto the print medium. In some examples, the orifices are arranged in at least one column or array such that properly sequenced ejection of ink from the orifices causes characters or other images to be printed upon the print medium as the printhead and the print medium are moved relative to each other.

DETAILED DESCRIPTION

In the following detailed description, reference is made to the accompanying drawings which form a part hereof, and in which is shown by way of illustration specific examples in which the disclosure may be practiced. It is to be understood that other examples may be utilized and structural or logical changes may be made without departing from the scope of the present disclosure. The following detailed description, therefore, is not to be taken in a limiting sense, and the scope of the present disclosure is defined by the appended claims. It is to be understood that features of the various examples described herein may be combined, in part or whole, with each other, unless specifically noted otherwise.

There may be advantages to having an integrated circuit (e.g., a semiconductor die) behave differently for various geographic regions, for subscription or non-subscription customers, or for other reasons. Rather than fabricate multiple physical integrated circuits designed to behave differently that may have to be tracked individually or managed separately, it may be easier to write some non-volatile memory bits to an integrated circuit (e.g., during manufacturing) to change the behavior of the integrated circuit.

Accordingly, disclosed herein are integrated circuits (e.g., fluid ejection dies) including a plurality of memory cells each storing a customization bit. In one example, the customization bits may be used to modify an address input to the die by summing the customization bits with an address from a nozzle data stream to generate a modified address. The modified address may be used to fire fluid actuation devices or to access memory cells corresponding to the fluid actuation devices based on the modified address. In other examples, the customization bits may be used to configure other operations of the integrated circuit as will be described below.

As used herein a "logic high" signal is a logic "1" or "on" signal or a signal having a voltage about equal to the logic power supplied to an integrated circuit (e.g., between about 1.8 V and 15 V, such as 5.6 V). As used herein a "logic low" signal is a logic "0" or "off" signal or a signal having a voltage about equal to a logic power ground return for the logic power supplied to the integrated circuit (e.g., about 0 V).

Figure 1A:
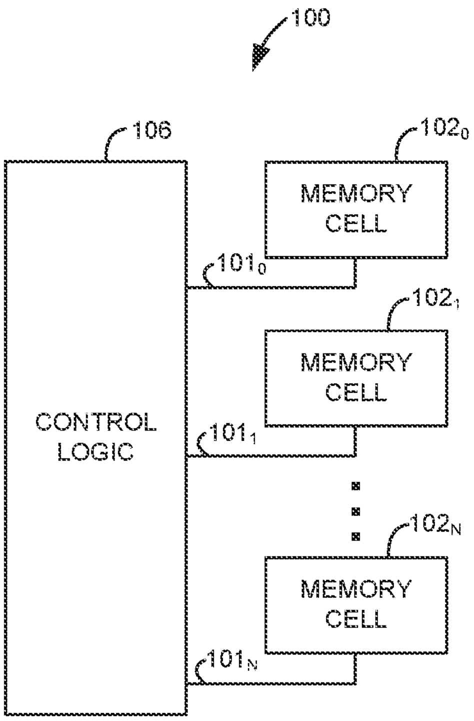
FIG. 1A is a block diagram illustrating one example of an integrated circuit to drive a plurality of fluid actuation devices.

FIG. 1A is a block diagram illustrating one example of an integrated circuit 100 to drive a plurality of fluid actuation devices. Integrated circuit 100 includes a plurality of memory cells $\mathbf{102}_0$ to $\mathbf{102}_N$, where "N" is any suitable number of memory cells (e.g., four memory cells). Integrated circuit 100 also includes control logic 106. Control logic 106 is electrically coupled to each memory cell $\mathbf{102}_0$ to $\mathbf{102}_N$ through a signal path $\mathbf{101}_0$ to $\mathbf{101}_N$, respectively.

Each first memory cell $\mathbf{102}_0$ to $\mathbf{102}_N$ stores a customization bit. Each first memory cell $\mathbf{102}_0$ to $\mathbf{102}_N$ may include a non-volatile memory cell (e.g., a floating gate transistor, a programmable fuse, a write-once memory cell, etc.). Control logic 106 may include a microprocessor, an application-specific integrated circuit (ASIC), or other suitable logic circuitry for controlling the operation of integrated circuit 100. Control logic 106 may prevent external read access to the plurality of memory cells $\mathbf{102}_0$ to $\mathbf{102}_N$. Write access to the plurality of memory cells $\mathbf{102}_0$ to $\mathbf{102}_N$ may be disabled once the customization bits are written to the memory cells $\mathbf{102}_0$ to $\mathbf{102}_N$, such as by writing a lock bit as will be described below with reference of FIG. 3.

Control logic 106 may configure an operation of the integrated circuit 100 based on the customization bits. In one example, the operation may be to modify an address input to the integrated circuit 100 based on the customization bits. In another example, read and/or write access to further memory cells (e.g., memory cells 130 to be described below with reference to FIG. 1B) of the integrated circuit or a subset of the further memory cells may be prevented or allowed based on the customization bits. In yet another example, a data stream (e.g., a nozzle data stream) or at least portions of a data stream received by the integrated circuit 100 may be inverted based on the customization bits. The data stream or portions of the data stream may be inverted anywhere along the data stream path. Multiple customization bits may be used for multiple inversion points.

In yet another example, the behavior of bits stored in a configuration register (not shown) of the integrated circuit 100 may be modified based on the customization bits. For example, delays bits in the configuration register for setting a delay of a function of the integrated circuit 100 may be reversed and/or encoded based on the customization bits. In any case, a single customization bit or a subset of the customization bits may be used to configure a single operation of the integrated circuit 100. Accordingly, the customization bits may be used to configure multiple operations of the integrated circuit 100, where each operation is configured based on different customization bits.

Figure 1B:
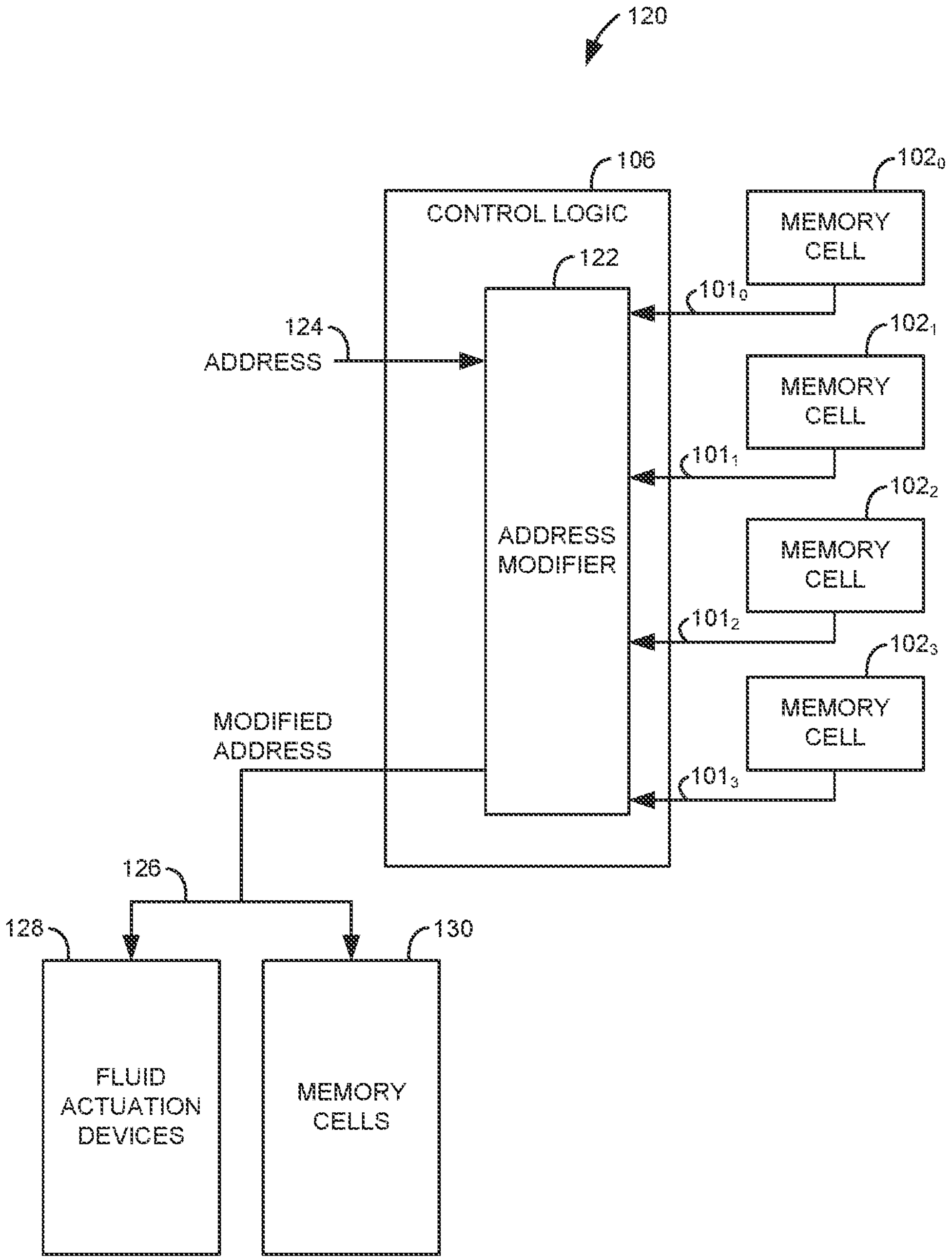
FIG. 1B is a block diagram illustrating another example of an integrated circuit to drive a plurality of fluid actuation devices.

FIG. 1B is a block diagram illustrating another example of an integrated circuit 120 to drive a plurality of fluid actuation devices. Integrated circuit 120 includes a plurality of first memory cells $\mathbf{102}_0$ to $\mathbf{102}_3$ and control logic 106. In addition, integrated circuit 120 includes fluid actuation devices 128 and a plurality of second memory cells 130. In this example, control logic 106 includes an address modifier 122. Address modifier 122 is electrically coupled to an address signal path 124, each first memory cell $\mathbf{102}_0$ to $\mathbf{102}_3$ through a signal path $\mathbf{101}_0$ to $\mathbf{101}_3$, respectively, and the fluid actuation devices 128 and the plurality of second memory cells 130 through a modified address signal path 126. Each of the plurality of second memory cells 130 includes a non-volatile memory cell (e.g., a floating gate transistor, a programmable fuse, etc.). In one example, fluid actuation devices 128 include nozzles or fluidic pumps to eject fluid drops.

In this example, there are four memory cells $\mathbf{102}_0$ to $\mathbf{102}_3$ to store four customization bits. The customization bits define the integrated circuit 120 as one of 16 unique integrated circuits. Each of the 16 unique integrated circuits operates differently due to the stored customization bits.

Address modifier 122 receives an address through address signal path 124. In one example, the address is part of a nozzle data stream input to the integrated circuit 120 from a host print apparatus, such as fluid ejection system 700 to be described below with reference to FIG. 7. Address modifier 122 also receives the stored customization bit from each first memory cell $\mathbf{102}_0$ to $\mathbf{102}_3$. Address modifier 122 modifies the address input to the integrated circuit 120 based on the customization bits to provide a modified address on signal path 126. In one example, control logic 106 fires fluid actuation devices 128 based on the modified address. In another example, control logic 106 accesses a second memory cell 130 based on the modified address.

Figure 2:
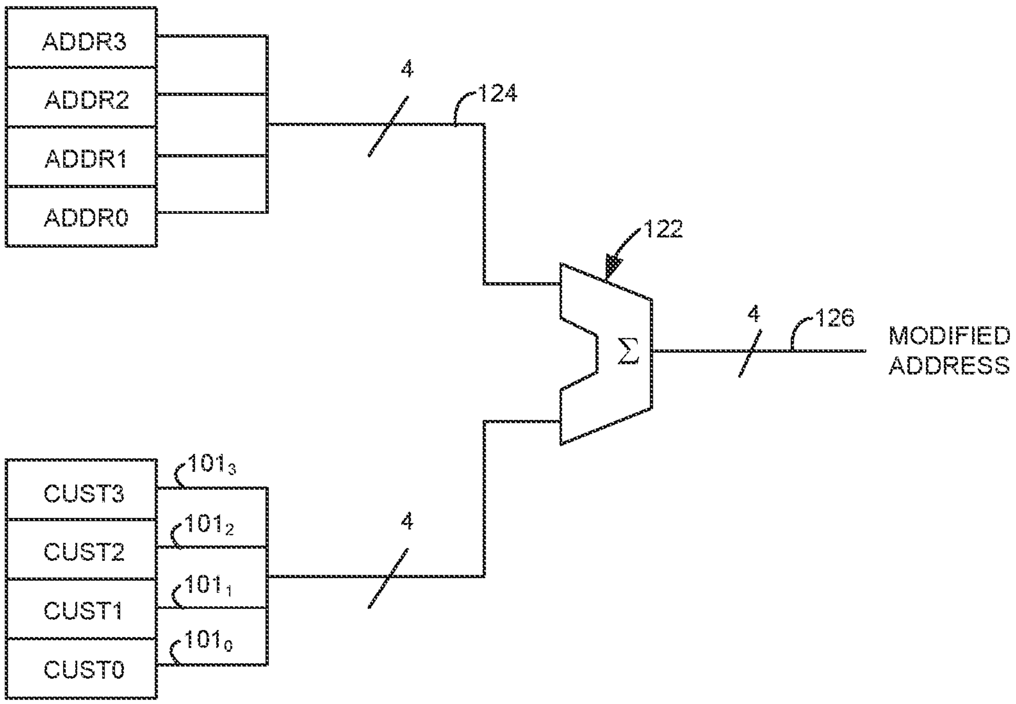
FIG. 2 illustrates one example of an address modifier.

FIG. 2 illustrates one example of an address modifier 122. In this example, address modifier 122 is a four bit adder. A first input of four bit adder 122 receives four address bits (ADDR0, ADDR1, ADDR2, and ADDR3) through signal path 124. A second input of four bit adder 122 receives four customization bits (CUST0, CUST1, CUST2, and CUST3) through signal paths $\mathbf{101}_0$ to $\mathbf{101}_3$, respectively. Four bit adder 122 sums the four address bits and the four customization bits to generate a modified address including four bits on signal path 126. In one example, the most significant bit resulting from the summing is discarded.

Figure 3:
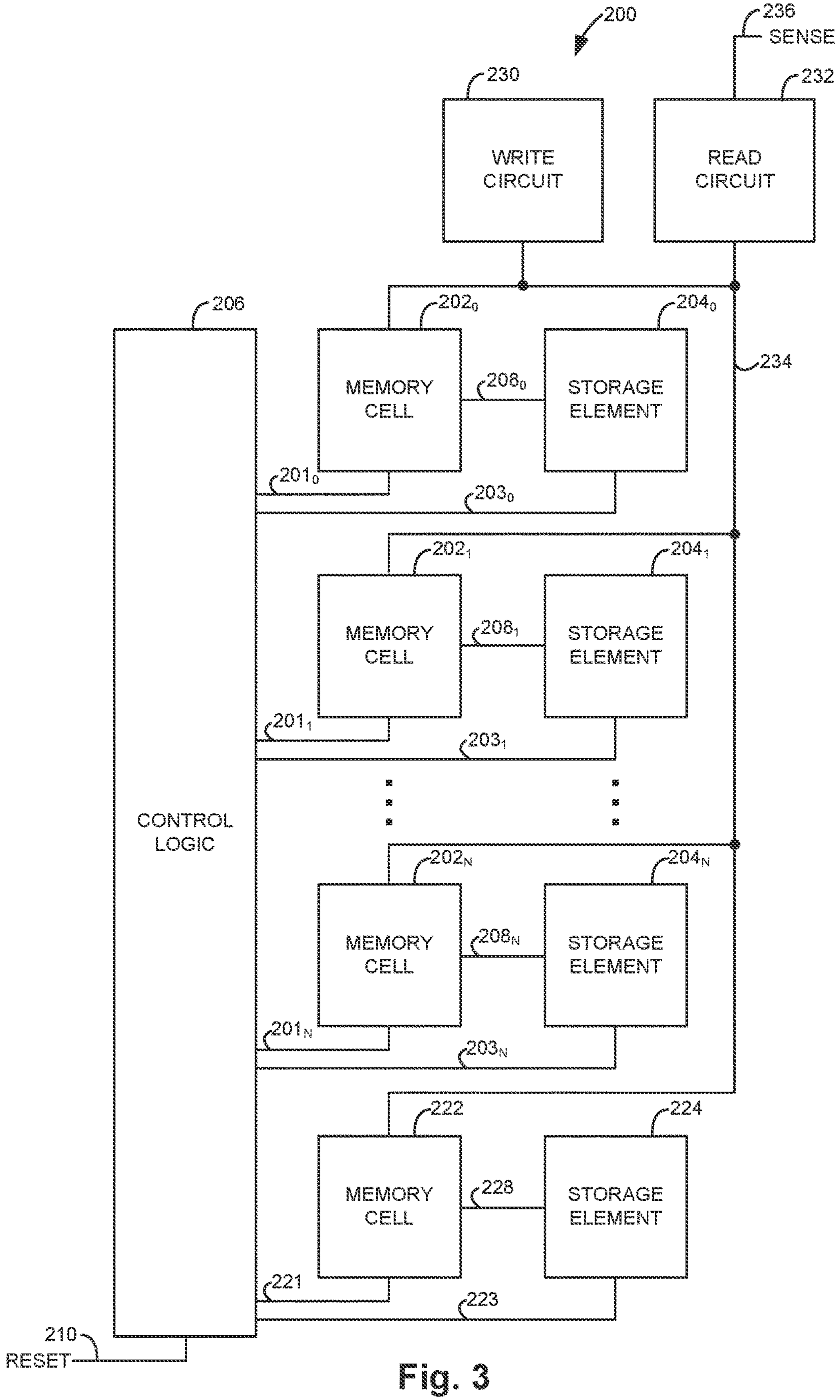
FIG. 3 is a block diagram illustrating another example of an integrated circuit to drive a plurality of fluid actuation devices.

FIG. 3 is a block diagram illustrating another example of an integrated circuit 200 to drive a plurality of fluid actuation devices. Integrated circuit 200 includes a plurality of first memory cells $\mathbf{202}_0$ to $\mathbf{202}_N$, a plurality of first storage elements $\mathbf{204}_0$ to $\mathbf{204}_N$, and control logic 206. In addition, integrated circuit 200 includes a second memory cell 222, a second storage element 224, a write circuit 230, and a read circuit 232. Control logic 206 is electrically coupled to each first memory cell $\mathbf{202}_0$ to $\mathbf{202}_N$ through a signal path $\mathbf{201}_0$ to $\mathbf{201}_N$, respectively, to each first storage element $\mathbf{204}_0$ to $\mathbf{204}_N$ through a signal path $\mathbf{203}_0$ to $\mathbf{203}_N$, respectively, and to a reset signal path 210. Each first memory cell $\mathbf{202}_0$ to $\mathbf{202}_N$ is electrically coupled to a corresponding first storage element $\mathbf{204}_0$ to $\mathbf{204}_N$ through a signal path $\mathbf{208}_0$ to $\mathbf{208}_N$, respectively.

Control logic 206 is also electrically coupled to second memory cell 222 through a signal path 221 and to storage element 224 through a signal path 223. The second memory cell 222 is electrically coupled to the storage element 224 through a signal path 228. Each first memory cell $\mathbf{202}_0$ to $\mathbf{202}_N$, the second memory cell 222, the write circuit 230, and the read circuit 232 are electrically coupled to a single interface (e.g., a single wire) 234. Read circuit 232 is electrically coupled to an interface (e.g., sense interface) 236.

The reset signal path 210 may be electrically coupled to a reset interface, which may be a contact pad, a pin, a bump, a wire, or another suitable electrical interface for transmitting signals to and/or from integrated circuit 200. The reset interface may be electrically coupled to a fluid ejection system (e.g., a host print apparatus such as fluid ejection system 700, which will be described below with reference to FIG. 7). The sense interface 236 may be a contact pad, a pin, a bump, a wire, or another suitable electrical interface for transmitting signals to and/or from integrated circuit 200. The sense interface 236 may be electrically coupled to a fluid ejection system (e.g., a host print apparatus such as fluid ejection system 700 of FIG. 7).

Each first memory cell $\mathbf{202}_0$ to $\mathbf{202}_N$ stores a customization bit. Each first memory cell $\mathbf{202}_0$ to $\mathbf{202}_N$ includes a non-volatile memory cell (e.g., a floating gate transistor, a programmable fuse, etc.). Each first storage element $\mathbf{204}_0$ to $\mathbf{204}_N$ includes a latch or another suitable circuit that outputs a logic signal (i.e., a logic high signal or a logic low signal) that may be directly used by digital logic. Control logic 206 may include a microprocessor, an application-specific integrated circuit (ASIC), or other suitable logic circuitry for controlling the operation of integrated circuit 200.

Control logic 206, in response to a reset signal on reset signal path 210, reads (e.g., in response to a first edge of the reset signal) the customization bit stored in each first memory cell $\mathbf{202}_0$ to $\mathbf{202}_N$ and latches (e.g., in response to a second edge of the reset signal) each customization bit in a corresponding first storage element $\mathbf{204}_0$ to $\mathbf{204}_N$. In one example, control logic 206 configures an operation of integrated circuit 200 based on the latched customization bits. In one example, the operation may modify an address input to the integrated circuit 200 based on the latched customization bits. In other examples, other operations of integrated circuit 200 may be modified based on the latched customization bits as previously described above.

The second memory cell 222 stores a lock bit. The second memory cell 222 includes a non-volatile memory cell (e.g., a floating gate transistor, a programmable fuse, etc.). The second storage element 224 includes a latch or another suitable circuit that outputs a logic signal (i.e., a logic high signal or a logic low signal) that may be directly used by digital logic. Control logic 206, in response to the reset signal, reads (e.g., in response to a first edge of the reset signal) the lock bit stored in the second memory cell 222 and latches (e.g., in response to a second edge of the reset signal) the lock bit in the second storage element 224. In addition, control logic 206 allows or prevents writing to the plurality of first memory cells $\mathbf{202}_0$ to $\mathbf{202}_N$ based on the latched lock bit. In one example, control logic 206 also allows or prevents writing to the second memory cell 222 based on the latched lock bit. For example, if a "0" lock bit is stored in the second memory cell 222, the customization bits stored in first memory cells $202_0$ to $202_N$ may be modified. Once a "1" lock bit is written to second memory cell 222, the customization bits stored in first memory cells $202_0$ to $202_N$ cannot be modified and the lock bit stored in the second memory cell 222 cannot be modified.

The write circuit 230 writes the corresponding customization bit to each of the plurality of first memory cells $202_0$ to $202_N$ through the single interface 234. The write circuit 230 may also write the lock bit to the second memory cell 222 through the single interface 234. In one example, write circuit 230 may include a voltage regulator and/or other suitable logic circuitry for writing customization bits to first memory cells $202_0$ to $202_N$ and the lock bit to second memory cell 222.

The read circuit 232 enables external access (e.g., via sense interface 236) to read the customization bit of each of the plurality of first memory cells $202_0$ to $202_N$ through the single interface 234. The read circuit 232 may also enable external access (e.g., via sense interface 236) to read the lock bit of the second memory cell 222 through the single interface 234. In one example, read circuit 232 may include transistor switches or other suitable logic circuitry for enabling external read access to first memory cells $202_0$ to $202_N$ and second memory cell 222 through sense interface 236. In one example, control logic 206 allows or prevents external read access to the plurality of first memory cells $202_0$ to $202_N$ and to second memory cell 222 based on the latched lock bit. For example, if a "0" lock bit is stored in the second memory cell 222, the customization bits stored in first memory cells $202_0$ to $202_N$ and the lock bit stored in the second memory cell 222 may be read through read circuit 232. Once a "1" lock bit is written to second memory cell 222, the customization bits stored in first memory cells $202_0$ to $202_N$ and the lock bit stored in the second memory cell 222 cannot be read through read circuit 232.

Figure 4A:
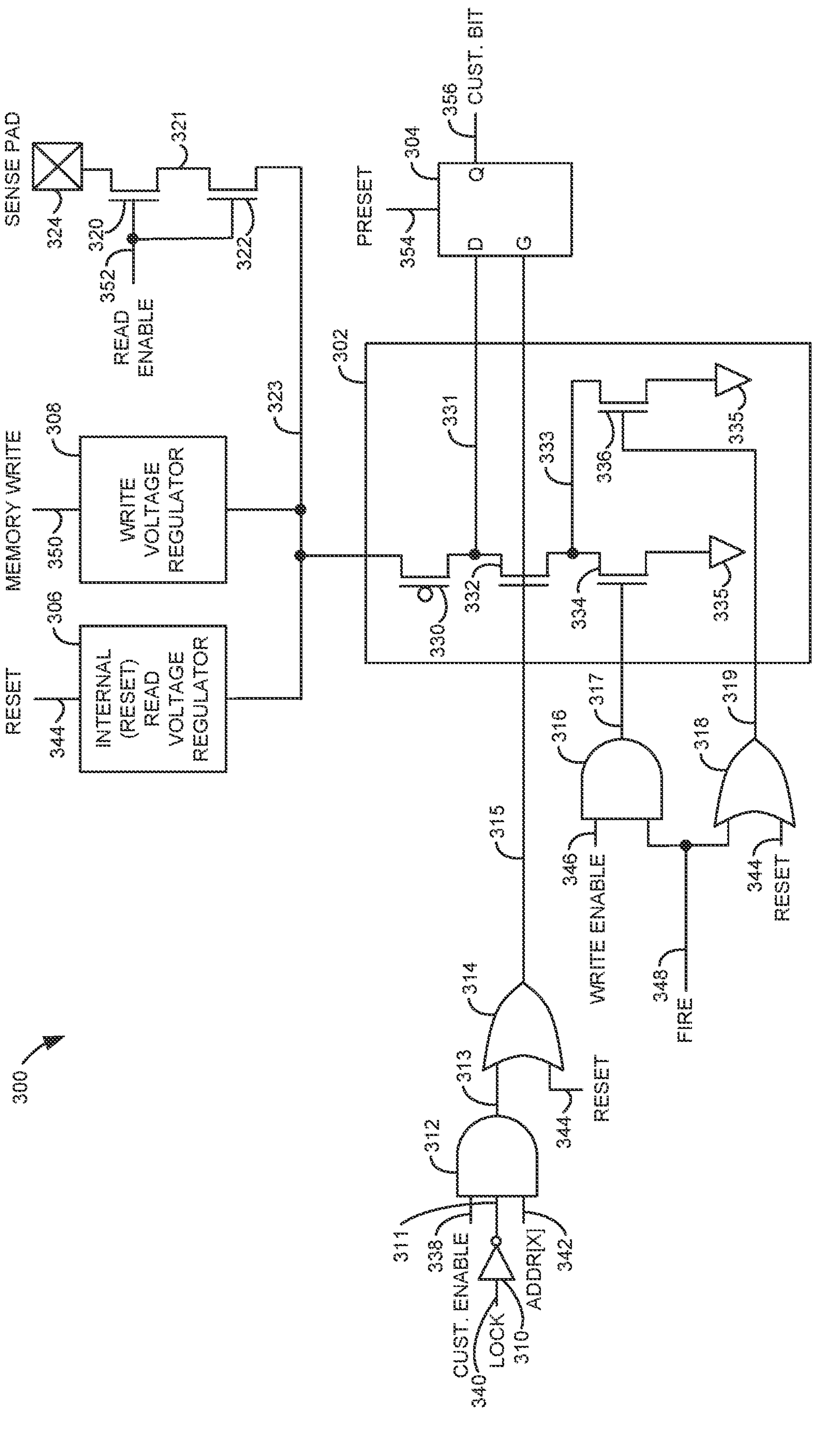
FIG. 4A is a schematic diagram illustrating one example of a circuit for accessing a memory cell storing a customization bit.

FIG. 4A is a schematic diagram illustrating one example of a circuit 300 for accessing a memory cell storing a customization bit. In one example, circuit 300 is part of integrated circuit 100 of FIG. 1A, integrated circuit 120 of FIG. 1B, or integrated circuit 200 of FIG. 3. Circuit 300 includes a memory cell 302, a latch 304, an internal (reset) read voltage regulator 306, a write voltage regulator 308, an inverter 310, AND gates 312 and 316, OR gates 314 and 318, transistors 320 and 322, and a sense pad 324. Memory cell 302 includes a floating gate transistor 330 and transistors 332, 334, and 336.

The input of inverter 310 is electrically coupled to a lock signal path 340. The output of inverter 310 is electrically coupled to a first input of AND gate 312 through a signal path 311. A second input of AND gate 312 is electrically coupled to a customization bit enable signal path 338. A third input of AND gate 312 is electrically coupled to a select signal (ADDR[X], which corresponds to one of Y address bits from a nozzle data stream, where "Y" is any suitable number of bits (e.g., 4)) path 342. The output of AND gate 312 is electrically coupled to a first input of OR gate 314 through a signal path 313. A second input of OR gate 314 is electrically coupled to a reset signal path 344. The output of OR gate 314 is electrically coupled to the gate of transistor 332 of memory cell 302 and the gate (G) input of latch 304 through a signal path 315.

A first input of AND gate 316 is electrically coupled to a write enable signal path 346. A second input of AND gate 316 is electrically coupled to a fire signal path 348. The output of AND gate 316 is electrically coupled to the gate of transistor 334 of memory cell 302 through a signal path 317. A first input of OR gate 318 is electrically coupled to the fire signal path 348. A second input of OR gate 318 is electrically coupled to the reset signal path 344. The output of OR gate 318 is electrically coupled to the gate of transistor 336 of memory cell 302 through a signal path 319.

An input of internal (reset) read voltage regulator 306 is electrically coupled to the reset signal path 344. An output of internal (reset) read voltage regulator 306 is electrically coupled to one side of the source-drain path of floating gate transistor 330 of memory cell 302 through a signal path 323. An input of write voltage regulator 308 is electrically coupled to a memory write signal path 350. An output of write voltage regulator 308 is electrically coupled to one side of the source-drain path of floating gate transistor 330 of memory cell 302 through signal path 323. Sense pad 324 is electrically coupled to one side of the source-drain path of transistor 320. The gate of transistor 320 and the gate of transistor 322 are electrically coupled to a read enable signal path 352. The other side of the source-drain path of transistor 320 is electrically coupled to one side of the source-drain path of transistor 322 through a signal path 321. The other side of the source-drain path of transistor 322 is electrically coupled to one side of the source-drain path of floating gate transistor 330 of memory cell 302 through signal path 323.

The other side of the source-drain path of floating gate transistor 330 is electrically coupled to one side of the source-drain path of transistor 332 and the data (D) input of latch 304 through a signal path 331. Another input of latch 304 is electrically coupled to a preset signal path 354. The output (Q) of latch 304 is electrically coupled to a customization bit signal path 356. The other side of the source-drain path of transistor 332 is electrically coupled to one side of the source-drain path of transistor 334 and one side of the source-drain path of transistor 336 through a signal path 333. The other side of the source-drain path of transistor 334 is electrically coupled to a common or ground node 335. The other side of the source-drain path of transistor 336 is electrically coupled to a common or ground node 335.

While circuit 300 includes one memory cell 302 for storing a customization bit and one corresponding latch 304, circuit 300 may include any suitable number of memory cells 302 and corresponding latches 304 for storing a desired number of customization bits. For each customization bit, each memory cell and corresponding latch would be accessed in a similar manner as described for memory cell 302 and latch 304.

Circuit 300 receives a customization enable signal on customization enable signal path 338, a lock signal on lock signal path 340, an address or select signal on select signal path 342, a reset signal on reset signal path 344, a write enable signal on write enable signal path 346, a fire signal on fire signal path 348, a memory write signal on memory write signal path 350, a read enable signal on read enable signal path 352, and a preset signal on preset signal path 354. The preset signal may be used to override latch 304 during testing to output a desired logic level from latch 304. The customization enable signal and the lock signal may be used to enable or disable write access and external read access to the memory cells storing customization bits. The address signal may be used to select one of the memory cells storing a customization bit. The customization enable signal, the write enable signal, the memory write signal, the read enable signal, and the preset signal may be based on data stored in a configuration register (not shown) or based on data received from a host print apparatus. The lock signal is an internal signal output from a latch, such as storage element 224 of FIG. 3.

The address signal is received from a host print apparatus, such as through a data interface. The reset signal may be received from a host print apparatus through a reset interface. The fire signal may be received from a host print apparatus through a fire interface. Each of the data interface, the reset interface, and the fire interface may include a contact pad, a pin, a bump, a wire, or another suitable electrical interface for transmitting signals to and/or from circuit 300. Each of the data interface, the reset interface, the fire interface, and the sense pad 324 may be electrically coupled to a fluid ejection system (e.g., a host print apparatus such as fluid ejection system 700 of FIG. 7).

Inverter 310 receives the lock signal and outputs an inverted lock signal on signal path 311. In response to a logic high customization enable signal, a logic high inverted lock signal, and a logic high select signal, AND gate 312 outputs a logic high signal on signal path 313. In response to a logic low customization enable signal, a logic low inverted lock signal, or a logic low select signal, AND gate 312 outputs a logic low signal on signal path 313.

In response to a logic high signal on signal path 313 or a logic high reset signal, OR gate 314 outputs a logic high signal on signal path 315. In response to a logic low signal on signal path 313 and a logic low reset signal, OR gate 314 outputs a logic low signal on signal path 315. In response to a logic high write enable signal and a logic high fire signal, AND gate 316 outputs a logic high signal on signal path 317. In response to a logic low write enable signal or a logic low fire signal, AND gate 316 outputs a logic low signal on signal path 317. In response to a logic high fire signal or a logic high reset signal, OR gate 318 outputs a logic high signal on signal path 319. In response to a logic low fire signal and a logic low reset signal, OR gate 318 outputs a logic low signal on signal path 319.

In response to a logic high signal on signal path 315, transistor 332 is turned on (i.e., conducting) to enable access to memory cell 302. In response to a logic low signal on signal path 315, transistor 332 is turned off to disable access to memory cell 302. In response to a logic high signal on signal path 317, transistor 334 is turned on to enable write access to memory cell 302. In response to a logic low signal on signal path 317, transistor 334 is turned off to disable write access to memory cell 302. In response to a logic high signal on signal path 319, transistor 336 is turned on to enable read access to memory cell 302. In response to a logic low signal on signal path 319, transistor 336 is turned off to disable read access to memory cell 302. In one example, transistor 334 is a stronger device and transistor 336 is a weaker device. Therefore, the stronger device may be used to enable write access and the weaker device may be used to enable read access to improve the margin for latching the voltage on signal path 331.

In response to a logic high reset signal, internal (reset) read voltage regulator 306 is enabled to output a read voltage bias to signal path 323. In response to logic low reset signal, internal (reset) read voltage regulator 306 is disabled. Accordingly, in response to the reset signal transitioning from a logic low to a logic high, transistors 332 and 336 turn on and internal (reset) read voltage regulator 306 is enabled to read the state (i.e., resistance representing the stored customization bit) of floating gate transistor 330. The state of floating gate transistor 330 is passed to the data (D) input of latch 304 (i.e., as a voltage representing the stored customization bit). In response to the reset signal transitioning from logic high to logic low, the customization bit stored in floating gate transistor 330 is latched by latch 304, transistors 332 and 336 turn off, and the internal (reset) read voltage regulator 306 is disabled. As a result, the customization bit is then available on the output (Q) of latch 304 and therefore on customization bit signal path 356 for use in other digital logic.

In response to a logic high read enable signal, transistors 320 and 322 are turned on to enable external access to memory cell 302 through sense pad 324. In response to a logic low read enable signal, transistors 320 and 322 are turned off to disable external access to memory cell 302 through sense pad 324. Accordingly, in response to a logic high customization enable signal, a logic low lock signal, a logic high address signal, a logic high read enable signal, and a logic high fire signal, transistors 320, 322, 332 and 336 are turned on to allow floating gate transistor 330 to be read through sense pad 324 by an external circuit.

In response to a logic high memory write signal, write voltage regulator 308 is enabled to apply a write voltage to signal path 323. In response to a logic low memory write signal, write voltage regulator 308 is disabled. Accordingly, in response to a logic high customization enable signal, a logic low lock signal, a logic high address signal, a logic high write enable signal, a logic high memory write signal, and a logic high fire signal, transistors 332, 334, and 336 are turned on to allow floating gate transistor 330 to be written by write voltage regulator 308.

Figure 4B:
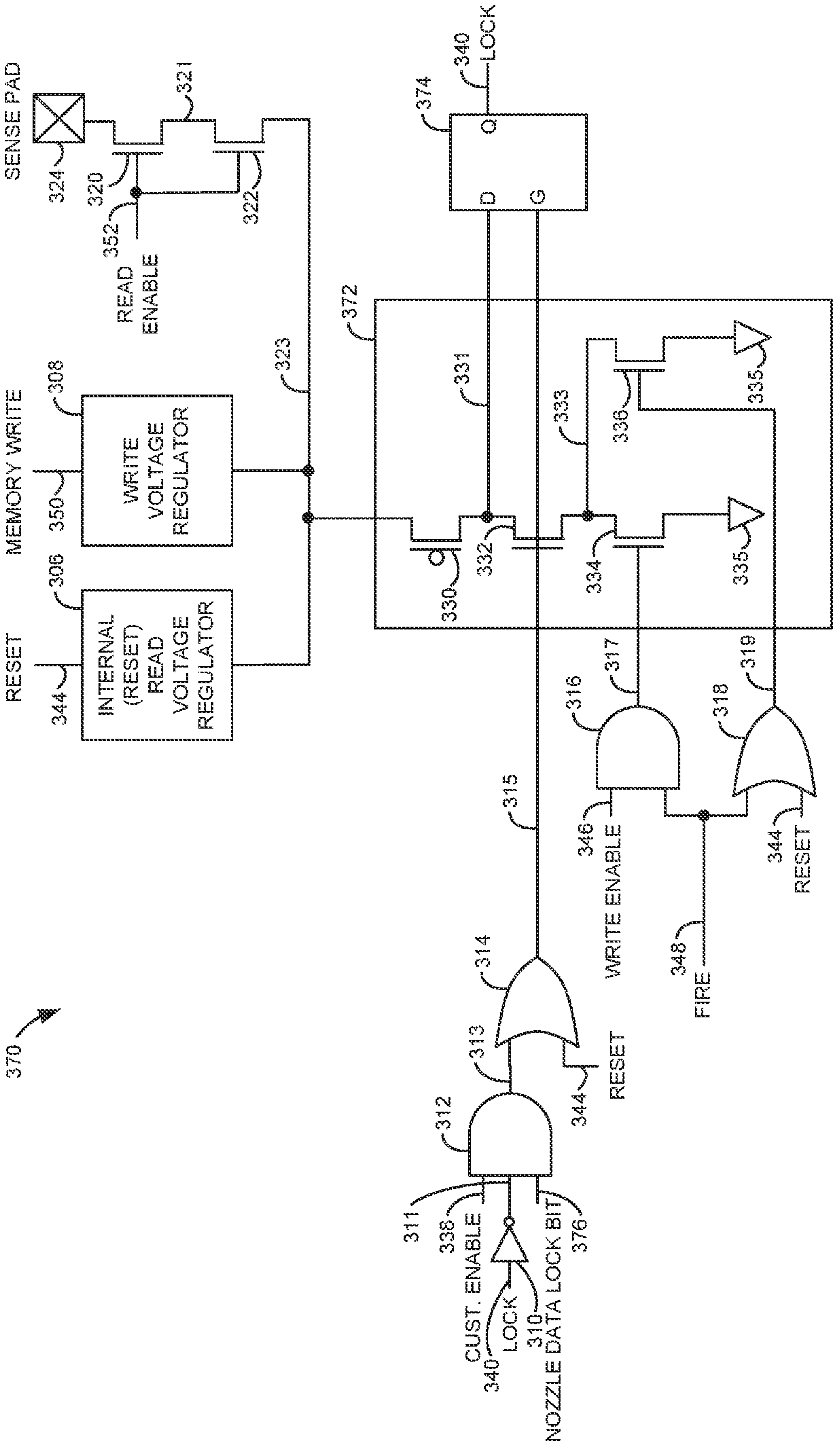
FIG. 4B is a schematic diagram illustrating one example of a circuit for accessing a memory cell storing a lock bit.

FIG. 4B is a schematic diagram illustrating one example of a circuit 370 for accessing a memory cell storing a lock bit. In one example, circuit 370 is part of integrated circuit 200 of FIG. 3. Circuit 370 is similar to circuit 300 previously described and illustrated with reference to FIG. 4A, except that in circuit 370, memory cell 302 is replaced with a memory cell 372 and latch 304 is replaced with a latch 374. Memory cell 372 stores a lock bit and latch 374 latches the lock bit in response to the reset signal.

Memory cell 372 is similar to memory cell 302 previously described. Latch 374 is similar to latch 304 previously described, except that latch 374 does not include a preset signal input. The output (Q) of latch 374 provides the lock signal on lock signal path 340, which is an input to inverter 310 (see also inverter 310 of FIG. 4A). In place of a select signal input to AND gate 312, a nozzle data lock bit signal is input to AND gate 312 through a nozzle data lock bit signal path 376. The nozzle data lock bit signal may be used to select memory cell 372. The nozzle data lock bit signal may be based on data received from a host print apparatus, such as through a data interface. Memory cell 372 may be enabled for write or read access similarly to memory cell 302 of FIG. 4A as previously described.

Figure 5:
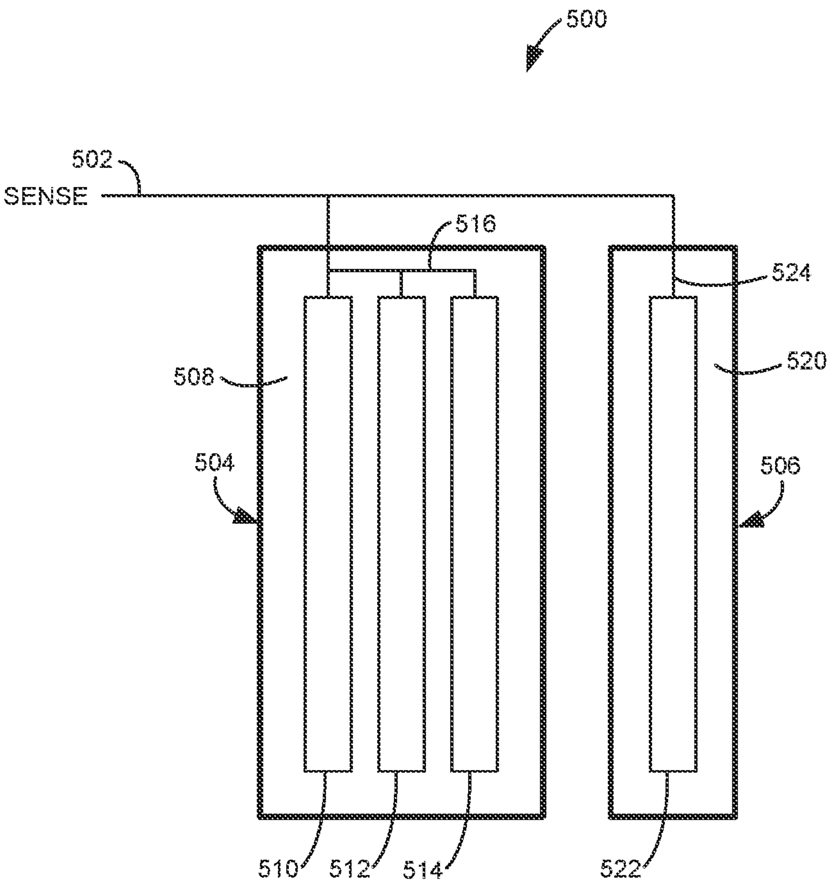
FIG. 5 illustrates one example of a fluid ejection device.

FIG. 5 illustrates one example of a fluid ejection device 500. Fluid ejection device 500 includes a sense interface 502, a first fluid ejection assembly 504 and a second fluid ejection assembly 506. First fluid ejection assembly 504 includes a carrier 508 and a plurality of elongate substrates 510, 512, and 514 (e.g., fluid ejection dies, which will be described below with reference to FIG. 6). Carrier 508 includes electrical routing 516 coupled to an interface (e.g., sense interface) of each elongate substrate 510, 512, and 514 and to sense interface 502. Second fluid ejection assembly 506 includes a carrier 520 and an elongate substrate 522 (e.g., a fluid ejection die). Carrier 520 includes electrical routing 524 coupled to an interface (e.g., sense interface) of the elongate substrate 522 and to sense interface 502. In one example, first fluid ejection assembly 504 is a color (e.g., cyan, magenta, and yellow) inkjet or fluid-jet print cartridge or pen and second fluid ejection assembly 506 is a black inkjet or fluid-jet print cartridge or pen.

In one example, each elongate substrate 510, 512, 514, and 522 includes an integrated circuit 100 of FIG. 1A, an integrated circuit 120 of FIG. 1B, an integrated circuit 200 of FIG. 3, or circuits 300 and/or 370 of FIGS. 4A and 4B. Accordingly, sense interface 502 may be electrically coupled to the sense interface 236 (FIG. 3) or sense pad 324 (FIGS. 4A and 4B) of each elongate substrate. Memory cells of each elongate substrate 510, 512, 514, and 522 may be accessed through sense interface 502 and electrical routing 516 and 524.

In one example, the customization bits of each elongate substrate 510, 512, and 514 of first fluid ejection assembly 504 vary between each elongate substrate. In one example, each elongate substrate 510, 512, 514, and 522 includes four non-volatile memory cells to store four customization bits. Therefore, the customization bits may define the fluid ejection assembly 504 as one of 4096 unique fluid ejection devices and the fluid ejection assembly 506 as one of 16 unique fluid ejection devices.

Figure 6A:
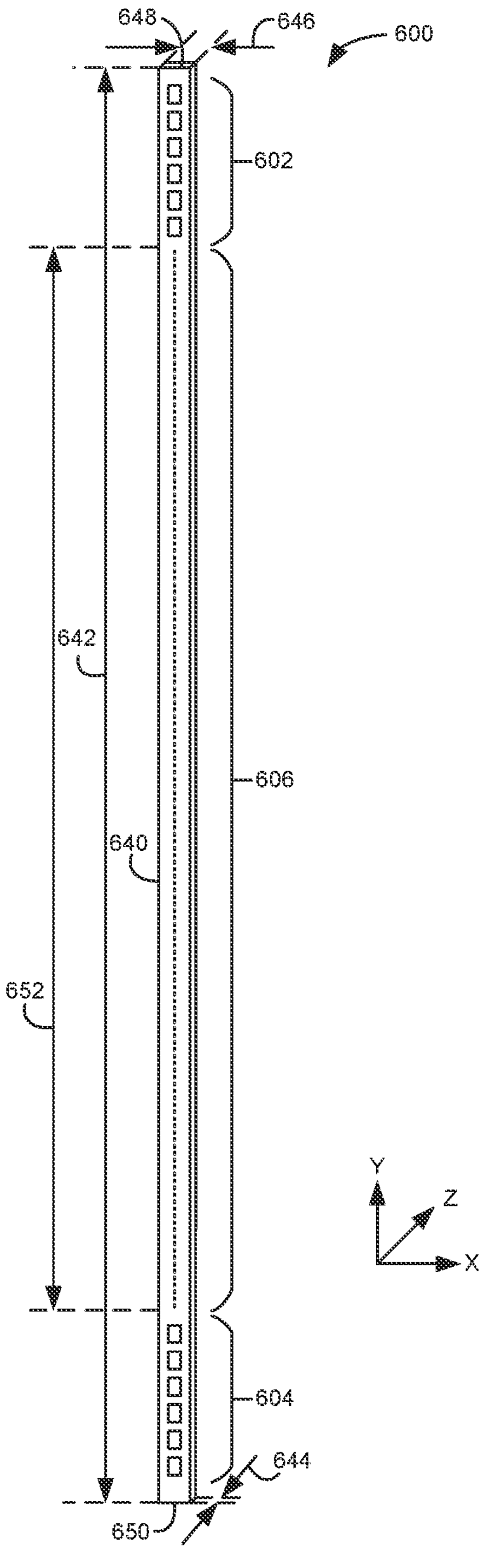
FIGS. 6A and 6B illustrate one example of a fluid ejection die.
Figure 6B:
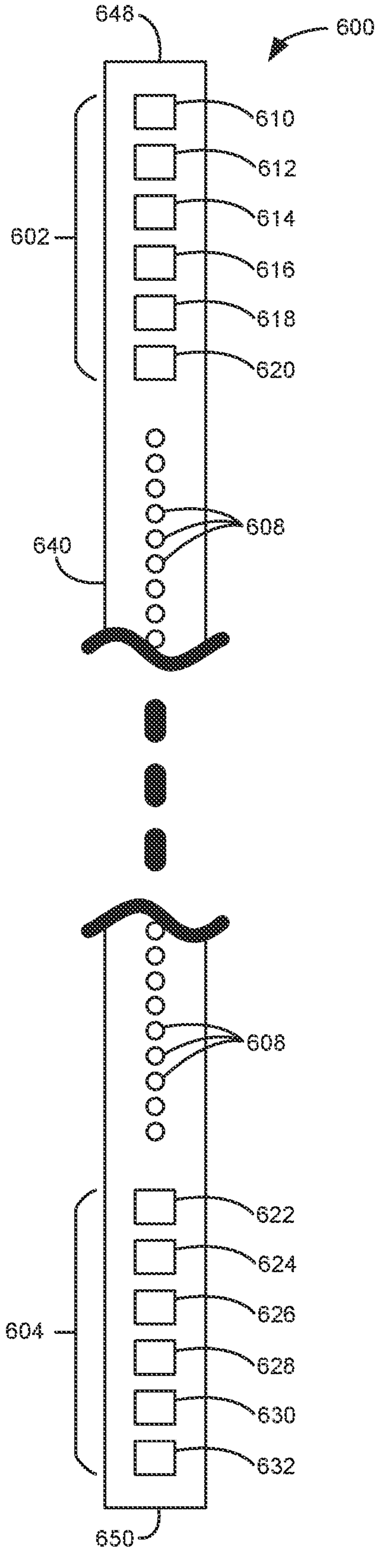

FIG. 6A illustrates one example of a fluid ejection die 600 and FIG. 6B illustrates an enlarged view of the ends of fluid ejection die 600. In one example, fluid ejection die 600 includes integrated circuit 100 of FIG. 1A, integrated circuit 120 of FIG. 1B, integrated circuit 200 of FIG. 3, or circuits 300 and/or 370 of FIGS. 4A and 4B. Die 600 includes a first column 602 of contact pads, a second column 604 of contact pads, and a column 606 of fluid actuation devices 608.

The second column 604 of contact pads is aligned with the first column 602 of contact pads and at a distance (i.e., along the Y axis) from the first column 602 of contact pads. The column 606 of fluid actuation devices 608 is disposed longitudinally to the first column 602 of contact pads and the second column 604 of contact pads. The column 606 of fluid actuation devices 608 is also arranged between the first column 602 of contact pads and the second column 604 of contact pads. In one example, fluid actuation devices 608 are nozzles or fluidic pumps to eject fluid drops.

In one example, the first column 602 of contact pads includes six contact pads. The first column 602 of contact pads may include the following contact pads in order: a data contact pad 610, a clock contact pad 612, a logic power ground return contact pad 614, a multipurpose input/output contact (e.g., sense) pad 616, a first high voltage power supply contact pad 618, and a first high voltage power ground return contact pad 620. Therefore, the first column 602 of contact pads includes the data contact pad 610 at the top of the first column 602, the first high voltage power ground return contact pad 620 at the bottom of the first column 602, and the first high voltage power supply contact pad 618 directly above the first high voltage power ground return contact pad 620. While contact pads 610, 612, 614, 616, 618, and 620 are illustrated in a particular order, in other examples the contact pads may be arranged in a different order.

In one example, the second column 604 of contact pads includes six contact pads. The second column 604 of contact pads may include the following contact pads in order: a second high voltage power ground return contact pad 622, a second high voltage power supply contact pad 624, a logic reset contact pad 626, a logic power supply contact pad 628, a mode contact pad 630, and a fire contact pad 632. Therefore, the second column 604 of contact pads includes the second high voltage power ground return contact pad 622 at the top of the second column 604, the second high voltage power supply contact pad 624 directly below the second high voltage power ground return contact pad 622, and the fire contact pad 632 at the bottom of the second column 604. While contact pads 622, 624, 626, 628, 630, and 632 are illustrated in a particular order, in other examples the contact pads may be arranged in a different order.

Data contact pad 610 may be used to input serial data to die 600 for selecting fluid actuation devices, memory bits, thermal sensors, configuration modes (e.g. via a configuration register), etc. Data contact pad 610 may also be used to output serial data from die 600 for reading memory bits, configuration modes, status information (e.g., via a status register), etc. Clock contact pad 612 may be used to input a clock signal to die 600 to shift serial data on data contact pad 610 into the die or to shift serial data out of the die to data contact pad 610. Logic power ground return contact pad 614 provides a ground return path for logic power (e.g., about 0 V) supplied to die 600. In one example, logic power ground return contact pad 614 is electrically coupled to the semiconductor (e.g., silicon) substrate 640 of die 600. Multipurpose input/output contact pad 616 may be used for analog sensing and/or digital test modes of die 600. In one example, multipurpose input/output contact (e.g., sense) pad 616 may provide sense interface 236 of FIG. 3 or sense pad 324 of FIGS. 4A and 4B.

First high voltage power supply contact pad 618 and second high voltage power supply contact pad 624 may be used to supply high voltage (e.g., about 32 V) to die 600. First high voltage power ground return contact pad 620 and second high voltage power ground return contact pad 622 may be used to provide a power ground return (e.g., about 0 V) for the high voltage power supply. The high voltage power ground return contact pads 620 and 622 are not directly electrically connected to the semiconductor substrate 640 of die 600. The specific contact pad order with the high voltage power supply contact pads 618 and 624 and the high voltage power ground return contact pads 620 and 622 as the innermost contact pads may improve power delivery to die 600. Having the high voltage power ground return contact pads 620 and 622 at the bottom of the first column 602 and at the top of the second column 604, respectively, may improve reliability for manufacturing and may improve ink shorts protection.

Logic reset contact pad 626 may be used as a logic reset input to control the operating state of die 600. In one example, logic reset contact pad 626 may be electrically coupled to reset signal path 210 of FIG. 3 or reset signal path 344 of FIGS. 4A and 4B. Logic power supply contact pad 628 may be used to supply logic power (e.g., between about 1.8 V and 15 V, such as 5.6 V) to die 600. Mode contact pad 630 may be used as a logic input to control access to enable/disable configuration modes (i.e., functional modes) of die 600. Fire contact pad 632 may be used as a logic input to latch loaded data from data contact pad 610 and to enable fluid actuation devices or memory elements of die 600. In one example, fire contact pad 632 may be electrically coupled to fire signal path 348 of FIGS. 4A and 4B.

Die 600 includes an elongate substrate 640 having a length 642 (along the Y axis), a thickness 644 (along the Z axis), and a width 646 (along the X axis). In one example, the length 642 is at least twenty times the width 646. The width 646 may be 1 mm or less and the thickness 644 may be less than 500 microns. The fluid actuation devices 608 (e.g., fluid actuation logic) and contact pads 610-632 are provided on the elongate substrate 640 and are arranged along the length 642 of the elongate substrate. Fluid actuation devices 608 have a swath length 652 less than the length

642 of the elongate substrate 640. In one example, the swath length 652 is at least 1.2 cm. The contact pads 610-632 may be electrically coupled to the fluid actuation logic. The first column 602 of contact pads may be arranged near a first longitudinal end 648 of the elongate substrate 640. The second column 604 of contact pads may be arranged near a second longitudinal end 650 of the elongate substrate 640 opposite to the first longitudinal end 648.

Figure 7:
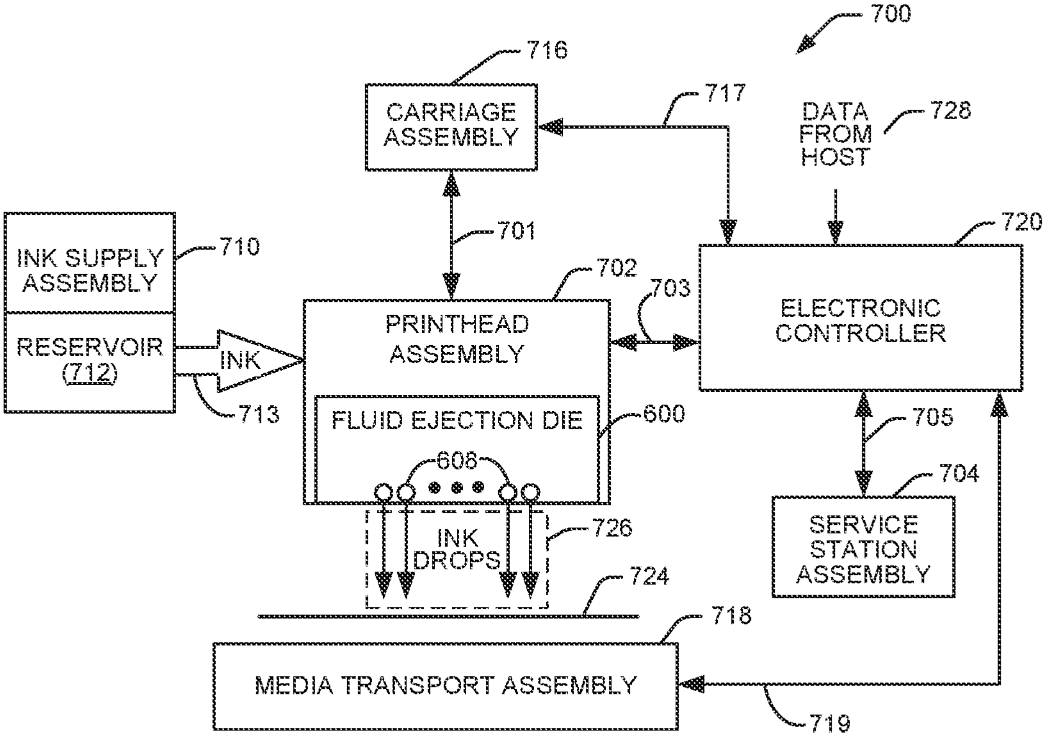
FIG. 7 is a block diagram illustrating one example of a fluid ejection system.

FIG. 7 is a block diagram illustrating one example of a fluid ejection system 700. Fluid ejection system 700 includes a fluid ejection assembly, such as printhead assembly 702, and a fluid supply assembly, such as ink supply assembly 710. In the illustrated example, fluid ejection system 700 also includes a service station assembly 704, a carriage assembly 716, a print media transport assembly 718, and an electronic controller 720. While the following description provides examples of systems and assemblies for fluid handling with regard to ink, the disclosed systems and assemblies are also applicable to the handling of fluids other than ink.

Printhead assembly 702 includes at least one printhead or fluid ejection die 600 previously described and illustrated with reference to FIGS. 6A and 6B, which ejects drops of ink or fluid through a plurality of orifices or nozzles 608. In one example, the drops are directed toward a medium, such as print media 724, so as to print onto print media 724. In one example, print media 724 includes any type of suitable sheet material, such as paper, card stock, transparencies, Mylar, fabric, and the like. In another example, print media 724 includes media for three-dimensional (3D) printing, such as a powder bed, or media for bioprinting and/or drug discovery testing, such as a reservoir or container. In one example, nozzles 608 are arranged in at least one column or array such that properly sequenced ejection of ink from nozzles 608 causes characters, symbols, and/or other graphics or images to be printed upon print media 724 as printhead assembly 702 and print media 724 are moved relative to each other.

Ink supply assembly 710 supplies ink to printhead assembly 702 and includes a reservoir 712 for storing ink. As such, in one example, ink flows from reservoir 712 to printhead assembly 702. In one example, printhead assembly 702 and ink supply assembly 710 are housed together in an inkjet or fluid-jet print cartridge or pen. In another example, ink supply assembly 710 is separate from printhead assembly 702 and supplies ink to printhead assembly 702 through an interface connection 713, such as a supply tube and/or valve.

Carriage assembly 716 positions printhead assembly 702 relative to print media transport assembly 718, and print media transport assembly 718 positions print media 724 relative to printhead assembly 702. Thus, a print zone 726 is defined adjacent to nozzles 608 in an area between printhead assembly 702 and print media 724. In one example, printhead assembly 702 is a scanning type printhead assembly such that carriage assembly 716 moves printhead assembly 702 relative to print media transport assembly 718. In another example, printhead assembly 702 is a non-scanning type printhead assembly such that carriage assembly 716 fixes printhead assembly 702 at a prescribed position relative to print media transport assembly 718.

Service station assembly 704 provides for spitting, wiping, capping, and/or priming of printhead assembly 702 to maintain the functionality of printhead assembly 702 and, more specifically, nozzles 608. For example, service station assembly 704 may include a rubber blade or wiper which is periodically passed over printhead assembly 702 to wipe and clean nozzles 608 of excess ink. In addition, service station assembly 704 may include a cap that covers printhead assembly 702 to protect nozzles 608 from drying out during periods of non-use. In addition, service station assembly 704 may include a spittoon into which printhead assembly 702 ejects ink during spits to ensure that reservoir 712 maintains an appropriate level of pressure and fluidity, and to ensure that nozzles 608 do not clog or weep. Functions of service station assembly 704 may include relative motion between service station assembly 704 and printhead assembly 702.

Electronic controller 720 communicates with printhead assembly 702 through a communication path 703, service station assembly 704 through a communication path 705, carriage assembly 716 through a communication path 717, and print media transport assembly 718 through a communication path 719. In one example, when printhead assembly 702 is mounted in carriage assembly 716, electronic controller 720 and printhead assembly 702 may communicate via carriage assembly 716 through a communication path 701. Electronic controller 720 may also communicate with ink supply assembly 710 such that, in one implementation, a new (or used) ink supply may be detected.

Electronic controller 720 receives data 728 from a host system, such as a computer, and may include memory for temporarily storing data 728. Data 728 may be sent to fluid ejection system 700 along an electronic, infrared, optical or other information transfer path. Data 728 represent, for example, a document and/or file to be printed. As such, data 728 form a print job for fluid ejection system 700 and includes at least one print job command and/or command parameter.

In one example, electronic controller 720 provides control of printhead assembly 702 including timing control for ejection of ink drops from nozzles 608. As such, electronic controller 720 defines a pattern of ejected ink drops which form characters, symbols, and/or other graphics or images on print media 724. Timing control and, therefore, the pattern of ejected ink drops, is determined by the print job commands and/or command parameters. In one example, logic and drive circuitry forming a portion of electronic controller 720 is located on printhead assembly 702. In another example, logic and drive circuitry forming a portion of electronic controller 720 is located off printhead assembly 702.

Figure 8A:
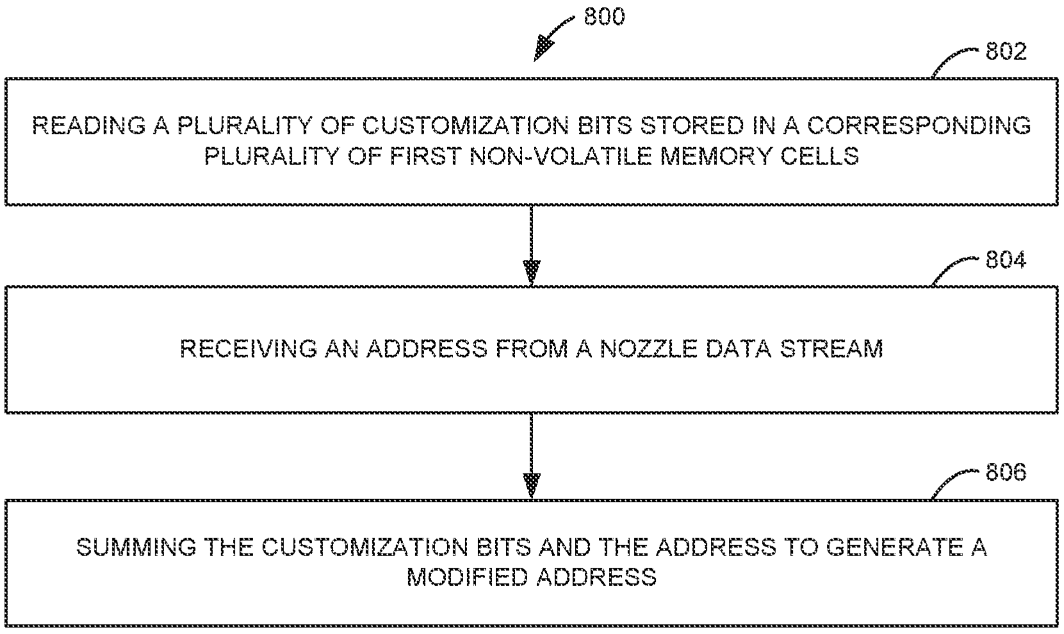
FIGS. 8A-8C are flow diagrams illustrating examples of a method for operating an integrated circuit to drive a plurality of fluid actuation devices.
Figure 8B:
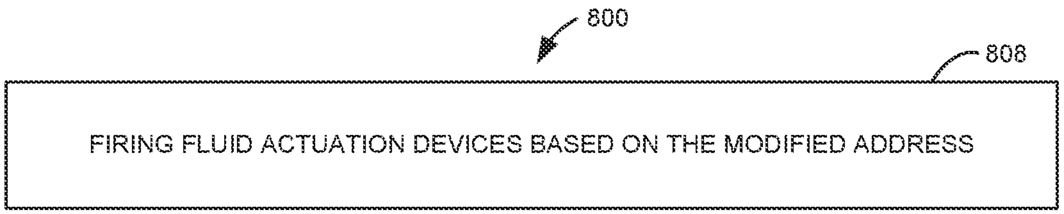
Figure 8C:
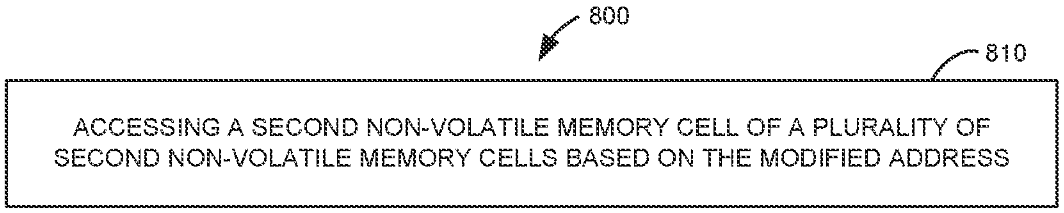

FIGS. 8A-8C are flow diagrams illustrating examples of a method 800 for operating an integrated circuit to drive a plurality of fluid actuation devices. In one example, method 800 may be implemented by integrated circuit 100 of FIG. 1A, integrated circuit 120 of FIG. 1B, integrated circuit 200 of FIG. 3, circuit 300 of FIG. 4A, and/or circuit 370 of FIG. 4B. As illustrated in FIG. 8A, at 802 method 800 includes reading a plurality of customization bits stored in a corresponding plurality of first non-volatile memory cells. At 804, method 800 includes receiving an address from a nozzle data stream. At 806, method 800 includes summing the customization bits and the address to generate a modified address.

In one example, the plurality of customization bits includes four customization bits and the address includes four bits. In this case, summing the customization bits and the address may include summing the customization bits and the address to generate a modified address including four bits where the most significant bit resulting from the summing is discarded. As illustrated in FIG. 8B, at 808 method 800 may further include firing fluid actuation devices based on the modified address. As illustrated in FIG. 8C, at 810 method 800 may further include accessing a second non-volatile memory cell of a plurality of second non-volatile memory cells based on the modified address.

Although specific examples have been illustrated and described herein, a variety of alternate and/or equivalent implementations may be substituted for the specific examples shown and described without departing from the scope of the present disclosure. This application is intended to cover any adaptations or variations of the specific examples discussed herein. Therefore, it is intended that this disclosure be limited only by the claims and the equivalents thereof.

The invention claimed is:

1. A fluid ejection device comprising:

a plurality of first non-volatile memory cells, each first non-volatile memory cell storing a customization bit;

a plurality of second non-volatile memory cells; and control logic to modify an address input to the fluid ejection device based on the customization bits and to fire fluid actuation devices based on the modified address, wherein at least one of the customization bits stored in the plurality of first non-volatile memory cells is modified based on information stored in the plurality of second non-volatile memory cells.

2. The fluid ejection device of claim 1, wherein the control logic is to access one of the plurality of second non-volatile memory cells based on the modified address.

3. The fluid ejection device of claim 1, wherein the customization bits define the fluid ejection device as one of a plurality of unique fluid ejection devices.

4. The fluid ejection device of claim 1, wherein the plurality of first non-volatile memory cells comprises four memory cells, and wherein the customization bits define the fluid ejection device as one of 16 unique fluid ejection devices.

5. The fluid ejection device of claim 1, wherein write access to the plurality of first non-volatile memory cells is disabled once the customization bits are written to the first non-volatile memory cells.

6. The fluid ejection device of claim 1, wherein the control logic prevents external read access to the plurality of first non-volatile memory cells.

7. The fluid ejection device of claim 1, wherein the control logic comprises an address modifier electrically coupled to the plurality of first non-volatile memory cells to modify the address input to the fluid ejection device.

8. The fluid ejection device of claim 7, wherein the address modifier comprises a bit adder to sum bits of the address and the customization bits to generate the modified address.

9. A fluid ejection device comprising:

a carrier; and a plurality of fluid ejection dies arranged parallel to each other on the carrier, each fluid ejection die having a length, a thickness, and a width, the length being at least twenty times the width, wherein each fluid ejection die comprises:

a plurality of fluid actuation devices;

a plurality of first non-volatile memory cells, each first non-volatile memory cell storing a customization bit;

a plurality of second non-volatile memory cells; and control logic to modify an address input to the fluid ejection die based on the customization bits and to fire fluid actuation devices based on the modified address, wherein the customization bits vary between each of the fluid ejection dies, and wherein at least one of the customization bits stored in the plurality of first non-volatile memory cells is modified based on information stored in the plurality of second non-volatile memory cells.

10. The fluid ejection device of claim 9, wherein the control logic is to access one of the plurality of second non-volatile memory cells based on the modified address.

11. The fluid ejection device of claim 9, wherein for each fluid ejection die, the customization bits uniquely define the fluid ejection die as one of the plurality of fluid ejection dies.

12. The fluid ejection device of claim 9, wherein for each fluid ejection die, the plurality of first non-volatile memory cells comprises four memory cells, and wherein the customization bits of the plurality of fluid ejection dies define the fluid ejection device as one of 4096 unique fluid ejection devices.

13. The fluid ejection device of claim 9, wherein for each fluid ejection die, write access to the plurality of first non-volatile memory cells is disabled once the customization bits are written to the first non-volatile memory cells.

14. The fluid ejection device of claim 9, wherein for each fluid ejection die, the plurality of first non-volatile memory cells are write-once memory cells.

15. The fluid ejection device of claim 9, wherein for each fluid ejection die, the control logic prevents external read access to the plurality of first non-volatile memory cells.

16. The fluid ejection device of claim 9, wherein for each fluid ejection die, the control logic comprises an address modifier electrically coupled to the plurality of first non-volatile memory cells to modify the address input to the fluid ejection die.

17. The fluid ejection device of claim 16, wherein for each fluid ejection die, the address modifier comprises a bit adder to sum bits of the address and the customization bits to generate the modified address.

18. A method for operating a fluid ejection device, the method comprising:

reading a plurality of customization bits stored in a corresponding plurality of first non-volatile memory cells;

reading a bit stored in a plurality of second non-volatile memory cells;

modifying at least one of the plurality of customization bits based on the bit stored in the plurality of second non-volatile memory cells;

receiving an address from a nozzle data stream;

summing the customization bits and the address to generate a modified address; and firing fluid actuation devices based on the modified address.

19. The method of claim 18, further comprising:

accessing a second non-volatile memory cell of the plurality of second non-volatile memory cells based on the modified address.

20. The method of claim 18, wherein the plurality of customization bits comprises four customization bits and the address comprises four bits, and wherein summing the customization bits and the address comprises summing the customization bits and the address to generate a modified address comprising four bits.

* * * * *